United States Patent [19]

Chang

[11] Patent Number: 5,083,629
[45] Date of Patent: Jan. 28, 1992

[54] WALKING CONTROL METHOD FOR AUTOMATIC WORKING VEHICLE

[75] Inventor: Chih-Li Chang, Hsinchu, Taiwan

[73] Assignee: Industrial Technology Research Institute, Hsinchu, Taiwan

[21] Appl. No.: 492,096

[22] Filed: Mar. 12, 1990

[51] Int. Cl.$^5$ .............................................. B62D 1/24
[52] U.S. Cl. .................................... 180/168; 56/10.2; 180/6.2; 180/167; 318/587
[58] Field of Search ............... 180/167, 168, 169, 612; 318/587; 56/10.2

[56] References Cited

U.S. PATENT DOCUMENTS

| | | | |
|---|---|---|---|
| 3,128,840 | 4/1964 | Barrett, Jr. | 318/587 |
| 3,570,227 | 3/1971 | Bellinger | 180/6.2 |
| 3,744,586 | 7/1973 | Leinauer | 180/169 |
| 4,372,407 | 2/1983 | McColl | 180/6.2 |
| 4,919,224 | 4/1990 | Shyu et al. | 180/168 |

Primary Examiner—Andres Kashnikow
Assistant Examiner—Eric Culbreth
Attorney, Agent, or Firm—Cushman, Darby & Cushman

[57] ABSTRACT

An automatic working machine which moves forward and turns back with a pre-determined shifted displacement to perform a task in a back and forth manner. The machine comprises sensors for detecting the boundaries of a defined area. The machine moves forward until the sensors detect a boundary or until a specific distance has been traveled, then the machine turns and proceeds forward in the opposite direction. The machine continues to perform in the specific back and forth motion until the task is completed.

4 Claims, 5 Drawing Sheets

WALKING CONTROL METHOD FOR AUTOMATIC WORKING VEHICLE

BACKGROUND OF THE INVENTION

In our daily life we often encounter some jobs which are best completed by moving in a back and forth manner. Examples of these are household chores such as sweeping, waxing, and mowing grass, farming which includes sowing, dunging, and reaping, and construction work which includes making terra cotta floors and painting, etc.. According to conventional methods, the worker will usually operate the tool or drive the apparatus in a back and forth manner on a surface of the specific work site. To obtain maximum efficiency, a minimum portion of the new working area should overlap slightly with the previously worked on area. For the automatic machine working on a specific area as in U.S. Pat. No. 4,919,224, the applicant developed a boundary-detecting device and a front-wheel steering device which control the vehicle movement between a boundary defining the working site. A set of wire sensors is applied to the device to detect the boundary of the working site in order to assure that the vehicle will turn when reaching the boundary in forward direction and proceed in the opposite direction. In another pending application Ser. No. 07,418,135, only a front-wheel steering device is applied to control the straight motion of the vehicle, and the deflecting angle of motion is to be detected and corrected by means of guide-line sensing.

In the U.S. Pat. No. 3,744,586, a flat surface is used as a reference surface to guide a moving machine. The machine is controlled to move straight by means which enable said machine to move along a flat surface. The turning movement of the machine is governed by a turning control device which controls the four wheels of the machine.

Unlike this prior art, the present invention provides two independent driving wheels such that each driving wheel can be driven forward or backwards to move the vehicle along the required trajectory. Also, the front of the vehicle always heads in the moving direction.

With regard to straight movement, the U.S. Pat. No. 3,744,586 requires a flat surface. However, in the present invention, the speed of the two driving wheels can be varied independently so as to keep the mileage of the wheels the same even when the vehicle encounters uneven surfaces. This control is closed loop control which is deemed to obtain better precision than the prior art.

With regard to turning and shifting a displacement, the U.S. Pat. No. 3,744,586 does not have means to turn its "head", instead, the vehicle directly moves backward and therefore the vehicle can be used in bi-directional machines only. However, the present machine can directly turn its "head" and shift in a displacement direction of the axis of the driving wheels. The movement of the machine is guided by a sensing apparatus which comprises odometers and guide line sensing modules, that is, the sensing modules generate feedback signals to the machine to indicate the required movement. In other words, the front of the machine always heads in the direction of movement and the present invention can be used in a simple unidirectional machine.

SUMMARY OF THE INVENTION

This invention provides an automatic working machine which includes two independent driving wheels mounted on both sides of the machine body. Each of the wheels is controlled by a wheel driver unit and has a feed back odometer. Each of the wheels can be driven at a zero, forward or reversed speed, and at an continuous speed variation to enable the machine body to move forward and turn with a shifted displacement. The front of the machine body or both sides of the driving wheel axis are mounted with two sensors respectively for detecting the position of the guide lines. The machine also judges the angle relation between the machine body and the guide line to control assure that the machine body turns correctly. The machine receives the feedback signal of the rpm or odometer of the two driving wheels at any time. When the machine body moves straight forward, the rpm of the two driving wheels is equal to each other. When the machine body turns, each of the two wheels independently maintain a suitable speed for turning the machine to position the front of the machine body opposite to the original moving direction or perpendicular to the guide line, and to shift the center of the axis of said two driving wheels of the machine body a predetermined displacement.

DETAILED DESCRIPTION OF THE INVENTION

Figure 1:
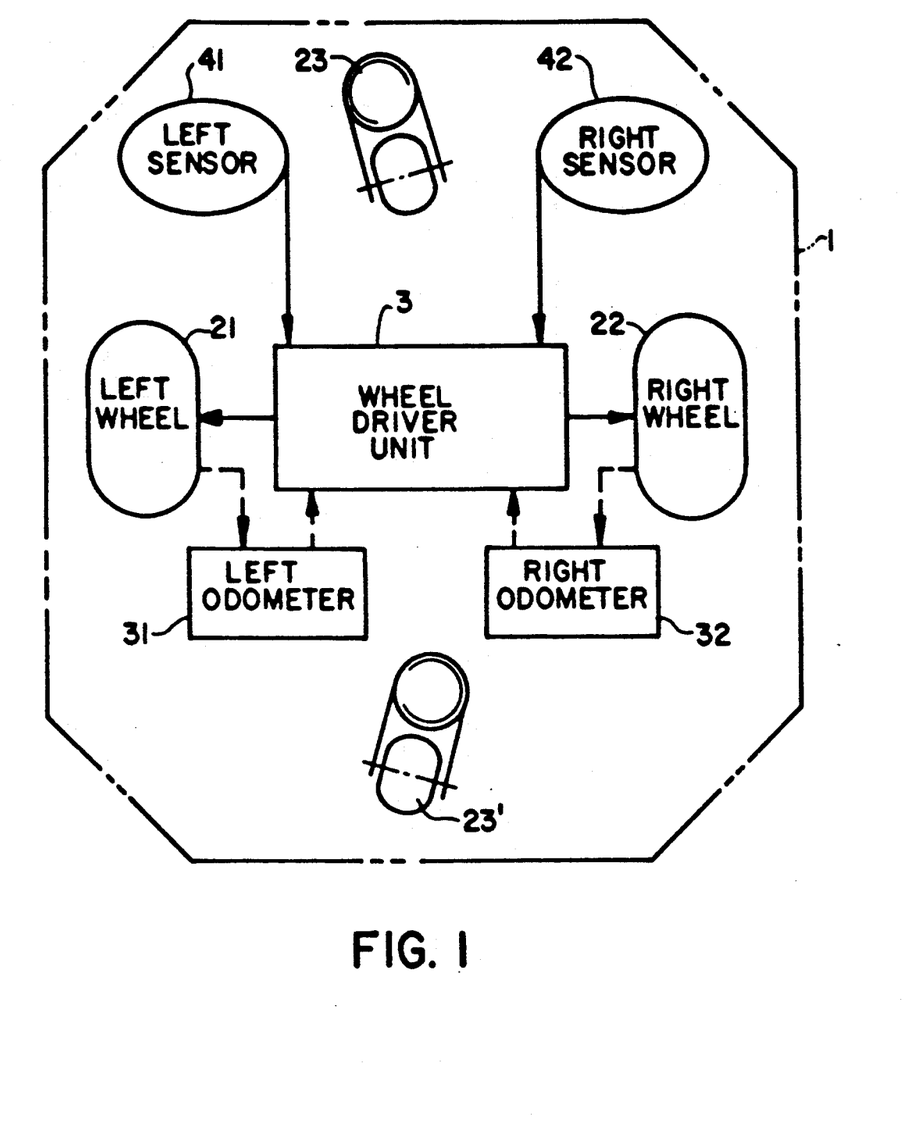
FIG. 1 illustrates the brief structure of an embodiment according to the present invention.

Referring to FIG. 1, there shows an automatic working machine, which can finish work within an area by following a guide wire installed around the boundary or at one side of said working area, and can move back and forth repeatedly to fill a specific area and finish the job. The working machine comprises a machine body 1 with a front end, rear end, and sides. The machine is equipped with working equipment (not shown) at different locations for different jobs, and is furnished with two independent driving wheels 21 and 22 and at least one center wheel 23 (or 23') so as to support the machine body 1 in a movable state. The two independent driving wheels 21 and 22 are mounted on both sides of the machine body 1 respectively. Each of the two wheels 21 and 22 can rotate at zero speed or at continuous speed in a forward or reverse direction to provide the machine body 1 with a required movement. For example, when the left driving wheel 21 stop at a fixed point and the right driving wheel 22 moves, the machine body 1 will move around the fixed point wherein the fixed point will act as a center. If both driving wheels 21 and 22 rotate at the same speed, the machine body 1 will move straight. Two guide-line sensors 41 and 42 are mounted on both front sides of the machine body respectively or on both sides of the wheel axis of the driving wheels 21 and 22 respectively to sense the position of the lateral guide line and thus signaling the machine body to turn around. A wheel driver unit 3 is used for driving and controlling the rotation speed of the two independent driving wheels 21 and 22. The machine also includes a micro-computer (not shown) to control the machine to work within a specific area. Two odometers 31 and 32 are mounted on the two independent driving wheels 21 and 22 respectively for detecting the mileage and the rotating speed of the two independent driving wheels.

Figure 2:
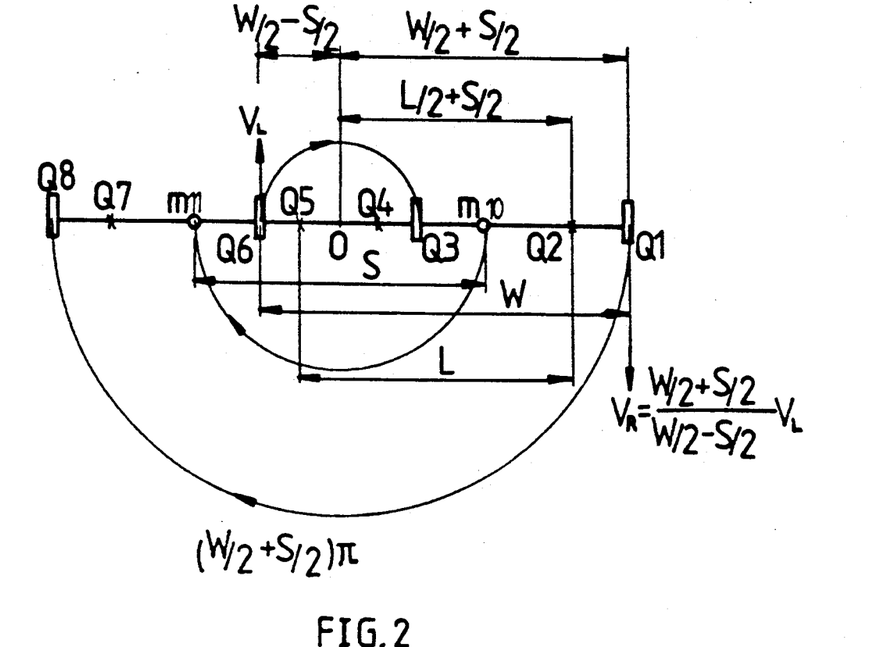
FIG. 2 illustrates embodiment-1 of the present invention in which the machine body turns backward and moves horizontally when the sensors are mounted over the wheel axis.

Referring to FIGS. 1 and 2, after the two guide line sensors 41 and 42 are mounted on the wheel axis of the two driving wheels 21 (left side) and 22 (right side), the initial position of the machine body is shown as follows: The left driving wheel 21 is at $Q_6$, the left guide line sensor 41 is at $Q_5$, the center of the wheel axis is at $M_{10}$, the right guide-line sensor 42 is at $Q_2$, and the right wheel 22 is at $Q_1$. When the left wheel 21 moves forward at a velocity $V_L$, and the right wheel 22 moves backwards at a velocity $V_R$, various points of the machine body form a locus as shown in FIG. 2, that is, the various points move around a center "0". After moving an angle of 180°, the horizontal shift displacement of the geometric enter of the machine body is S (distance between $M_{10}$ and $M_{11}$) All the various points still fall on the wheel axis, and the plane positions of various points of the machine body will be shown as follows:

The left wheel 21 is at $Q_3$, the left sensor 41 is at $Q_4$, the wheel axis center is at $M_{11}$, the right sensor 42 is at $Q_7$, and the right wheel 22 is at $Q_8$. As shown in the FIG. 2, the distance between the locations of the two sensors 41 and 42 is "L". The distance between the locations of the two wheels 21 and 22 is "W". When the rotating velocity $V_L$ and $V_R$ of the two wheels 21 and 22 satisfy the equation $$V_R = \frac{W/2 + S/2}{W/2 - S/2} V_L$$

the turning radii will be $Q_6 O = W/2 - S/2$ radius of $Q_6O = W/2 - S/2$
$Q_5 O = L/2 - S/2$ radius of $Q_5O = L/2 - S/2$
$M_{10} O = X/2$ radius of $M_{10}O = S/2$
$Q_2 O = L/2 + S/2$ and radius of $Q_2O = L/2 + S/2$
$Q_1 O = W/2 + S/2$ radius of $Q_1O = W/2 + S/2$ The above equations are still correct in the case of "S", "$V_R$" or "$V_L$" being negative (reverse direction). The moving mileage of the machine can be obtained by the equation:

*mileage* = 2 × *radius* × π × *number of rotations*

Figure 3:
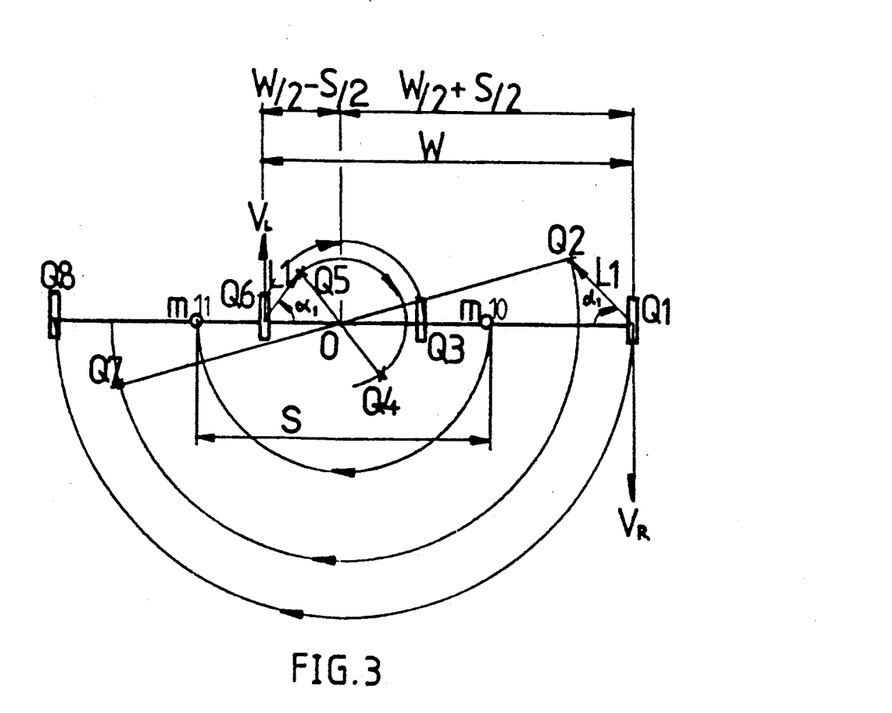
FIG. 3 illustrates embodiment-2 of the present invention in which the machine body turns backward and moves horizontally when the sensors are mounted in front of the wheel axis.

FIG. 3 illustrates the initial positioning of the machine body when the sensors 41 and 42 are mounted on the front end of the machine body. In this case, the distance between the left wheel 21 at $Q_6$ and the sensor 41 at $Q_5$ and between the right wheel 22 at $Q_1$ and the sensor 42 at $Q_2$ is "$L_1$". A contained angle $a_1$ is formed between the line from the left sensor 41 to the left wheel 21 and the wheel axis. Another contained angle $X_1$ is also to be formed between the line from the right sensor 42 to the right wheel 22 and the wheel axis. When the left wheel 21 moves forward at a velocity $V_L$, and the right wheel 22 moves backwards at a velocity $V_R$, the plane projecting locus of various points of the machine body will be that as shown in FIG. 3. If the initial points of the left wheel 21, the left sensor 41, the wheel axis center $M_{10}$, the right sensor 42 and the right wheel 22 are respectively on $Q_6$, $Q_5$, $M_{10}$, $Q_2$, and $Q_1$, and if the movement proceeds around a center "O" with a distance between the two wheels being "W", the aforesaid points after the machine body rotates 180° around the geometric center of the machine and shifts a displacement "S" (the distance between $M_{10}$ and $M_{11}$) will be on $Q_3$, $Q_4$, $M_{11}$, $Q_7$, and $Q_8$, respectively.

When $V_R = \frac{W/2 + S/2}{W/2 - S/2} V_L$ the turning radii will be
radius of $Q_6O = W/2 - S/2$ rad. of $Q_5O = \sqrt{L_1^2 + (W/2 - S/2)^2 - 2L_1(W/2 - S/2)\cos a_1}$ radius of $M_{10}O = S/2$ rad. of $Q_2O = \sqrt{L_1^2 + (W/2 + S/2)^2 - 2L_1(W/2 + S/2)\cos a_1}$ radius of $Q_1O = W/2 + S/2$ The above equations are still correct in the case of "S", "$V_R$" or "$V_L$" being negative (reverse direction) and the moving mileage of the machine also can be obtained by the equation:

*mileage* = 2 × *radius* × π × *number of rotations.*

If the left and the right wheels 21 and 22 are moving at the same speed, the location of the geometric center of the machine body will be in a straight line theoretically. However, the rotating speed of the two wheels 21 and 22 is not always identical due to uneven terrain of some disturbances. Therefore, the moving direction of the machine body will tend to deviate from a straight line. The difference between the mileage recorded by the two odometers is used as a reference in adjusting the speed of the two wheels 21 and 22 to maintain a straight line direction. In other words, the wheel having less mileage is adjusted to a higher speed and, the wheel having more mileage is adjusted to a lower speed thus maintaining a straight direction. The functional relationship between the two wheels in terms of speed difference is shown as follows:

$$V_R = V - K_P(D_R - D_L)^E$$

$$V_L = V - K_P(D_L - D_R)^E$$

in which: V = expected speed,
$K_P$ = constant of proportion
$D_R$ = the total mileage recorded by the right-side odometer when the wheel moves
$D_L$ = the total mileage recorded by the left-side odometer when the wheel moves
E = exponential constant
When E = 1,
$V_R = V - KP(D_R - D_L)$
$V_L = V - KP(D_L - D_R)$.

When the machine moves, the microcomputer in the wheel driver unit 3 calculates the information fed back from the left and right odometers 31 and 32, and then sends out speed instructions $V_L$ and $V_R$ to the left and right wheels 21 and 22 respectively to control the machine to move straight until the two sensors 41 and 42 has sensed the lateral guide line or one of the odometers 31 and 32 has reached a pre-determined value.

The wheel driver unit 3 sends out various drive instructions to let the machine move along various types of locations within the limit of the lateral guide lines.

Figure 4:
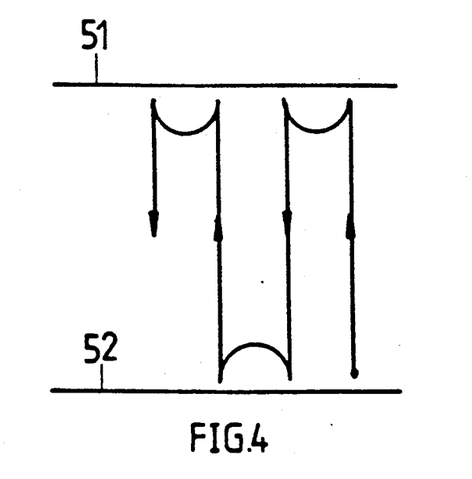
FIG. 4 illustrates the locus of the machine body when the machine moves, along a route which is perpendicular to and between two lateral guide wires.

As shown in FIG. 4, two lateral guide lines 51 and 52 are installed on both ends of the routes. Whenever the machine moves straight forward and senses one of the lateral guide lines 51 by the sensors 41 and 42, the two driving wheels 21 and 22 move at different speeds to have the machine body turn around a turning center. After the machine turns to a position that is perpendicular to the lateral guide wire 51, the machine body will be facing an opposite direction and be shifted a predetermined displacement from its original position of contact with the guide line. The machine continues to move forward until the sensors 41 and 42 sense another lateral guide line 52. Then the machine body turns and shifts again as described. The machine repeats the operation as mentioned above until completed.

Figure 5:
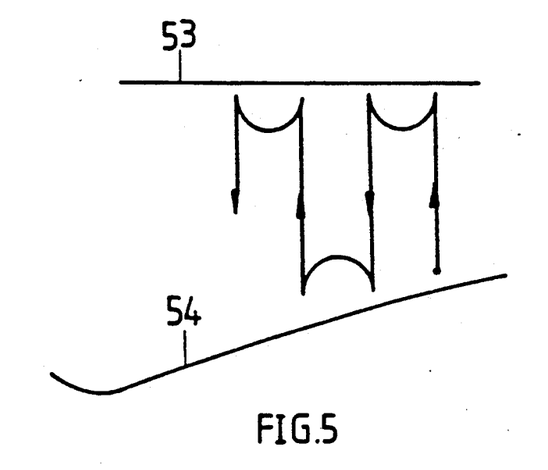
FIG. 5 illustrates the locus of the machine body when the machine moves along a route between two lateral guide wires in which one lateral guide wire is not perpendicular to the route.

FIG. 5. illustrates a second example of lateral guide layout. The two guide lines 53 and 54 are installed on both ends of the movement routes respectively. The lateral guide line 53 is installed straight but the lateral guide line 54 is not installed in a straight line with respect to guide line 53. After the machine body moves forward and senses the lateral guide line 53 through sensors 41 and 42, the machine body turns and shifts in a displacement as previously described and thus becomes perpendicular to the lateral guide line 53 facing in an opposite direction. The machine then moves forward continuously until sensors 41 and 42 sense another lateral guide line 54. Then the machine body turns and shifts horizontally as previously described. The machine now is facing opposite of guide line 54 and perpendicular to guide line 53. The machine then moves repeatedly as mentioned above until completed.

Figure 6:
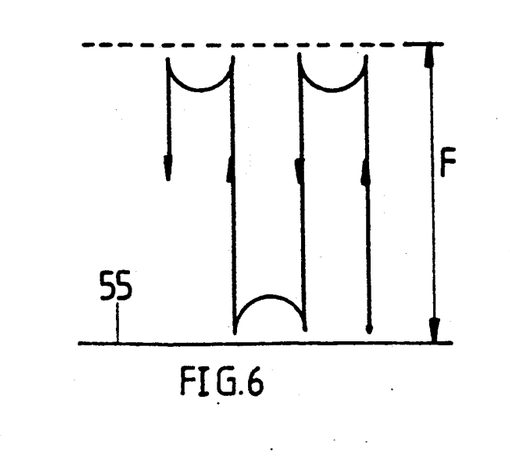
FIG. 6 illustrates the locus of the machine body when the machine moves along a route which is perpendicular to one lateral guide wire.

FIG. 6 illustrates a third example in which a lateral guide line 55 is installed only one side of the movement route. The machine moves forward a predetermined distance F, then turns reversely and shifts a predetermined displacement, and then moves forward continuously until the sensors 41 and 42 sense the lateral guide line 55. Then the machine turns and shifts again as previously described and thus is perpendicular to the lateral guide line 55. The aforesaid movement is then repeated until completed.

Figure 7:
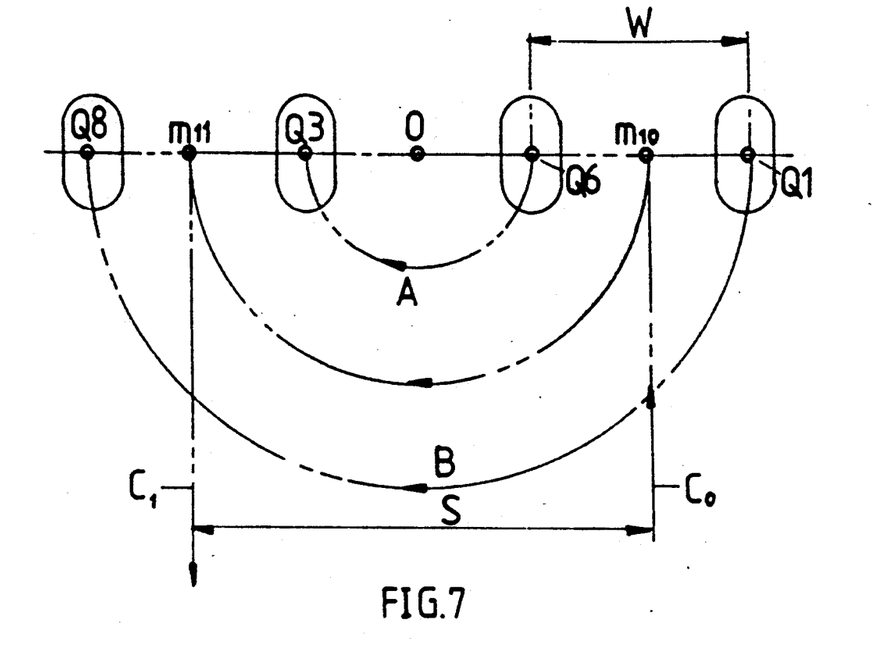
FIG. 7 illustrates the locus of the machine body when the machine turns backward and moves horizontally with the turning center being not between two wheels of the machine.
Figure 8:
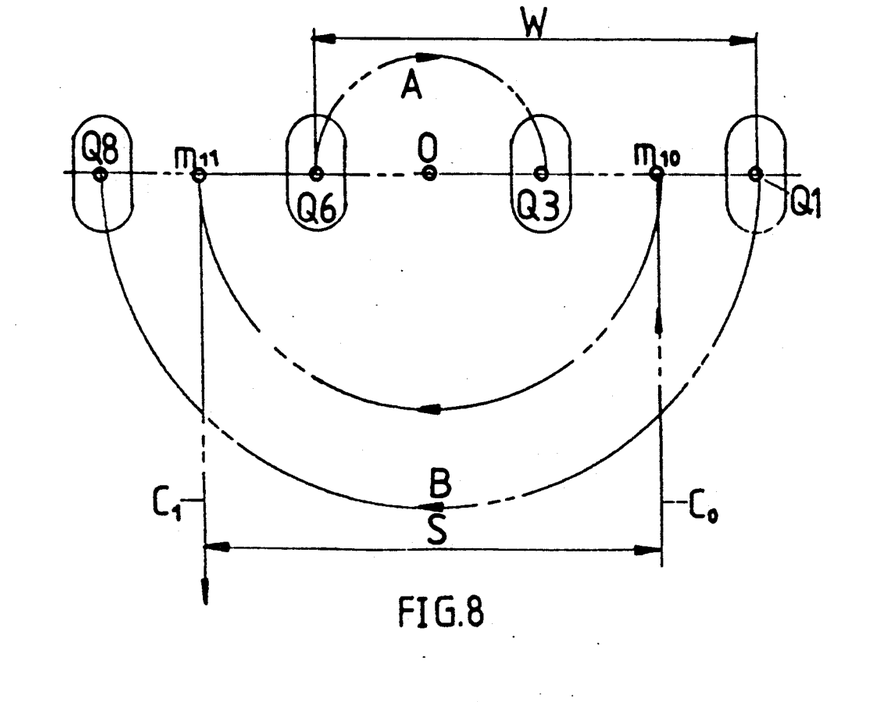
FIG. 8 illustrates the locus of the machine body when the machine turns backward and moves horizontally with the turning center being between the two wheels of the machine.

After the machine body turns, a shifted displacement occurs. The relationship between "S" (shifted displacement) and "W" (wheel distance) may be described under three conditions. The first and second conditions are shown in FIGS. 7 and 8. After the machine moves forward along a straight line $C_0$, the machine body turns reversely upon reaching position $M_{10}$. The left wheel 21 and the right wheel 22 move a distance A and a distance B respectively from $Q_6$ and $Q_1$ to $Q_3$ and $Q_8$ while the machine body moves from $M_{10}$ to $M_{11}$. Therefore, pre-determined shifted displacement, $S = M_{10}M_{11}$ is obtained. As shown in FIG. 7 the turning center O is located outside the space between the two wheels 21 and 22, i.e., S>W. In FIG. 8, the turning center O is located between the two wheels 21 and 22, that is, S<W. According to the third condition (not shown), the turning center is located at a position at one of the two wheels 21 and 22, that is, S=W. The control methods to have the machine body turn reversely, shift a displacement, and become perpendicular to a lateral guide line are described as follows.

Figure 9:
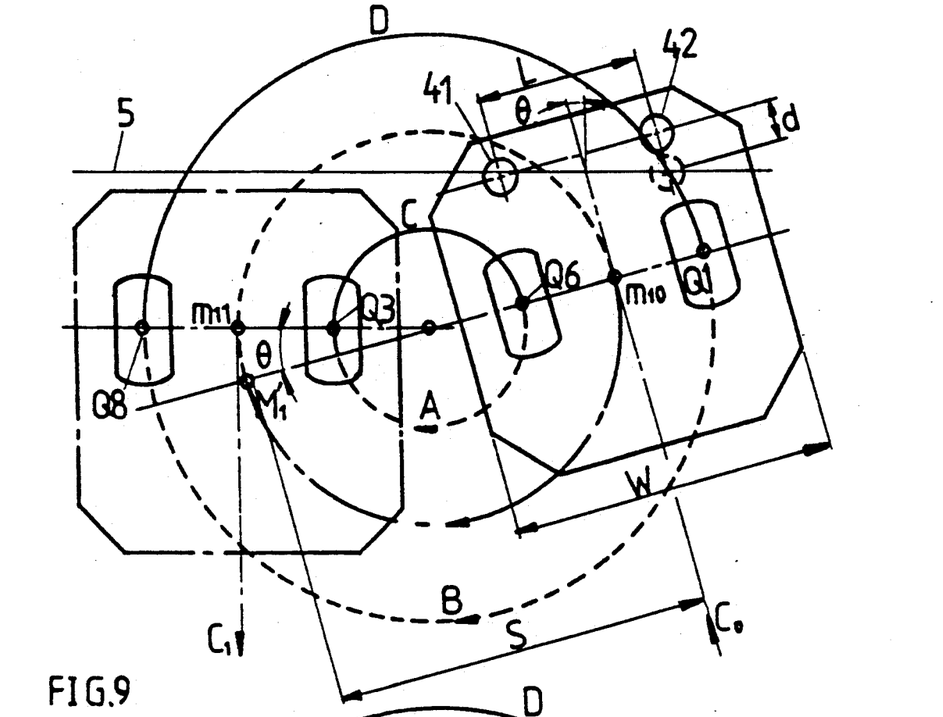
FIG. 9 illustrates the locus of the machine body when the machine turns backward, moves horizontally and forward at a positive deviation angle.
Figure 10:
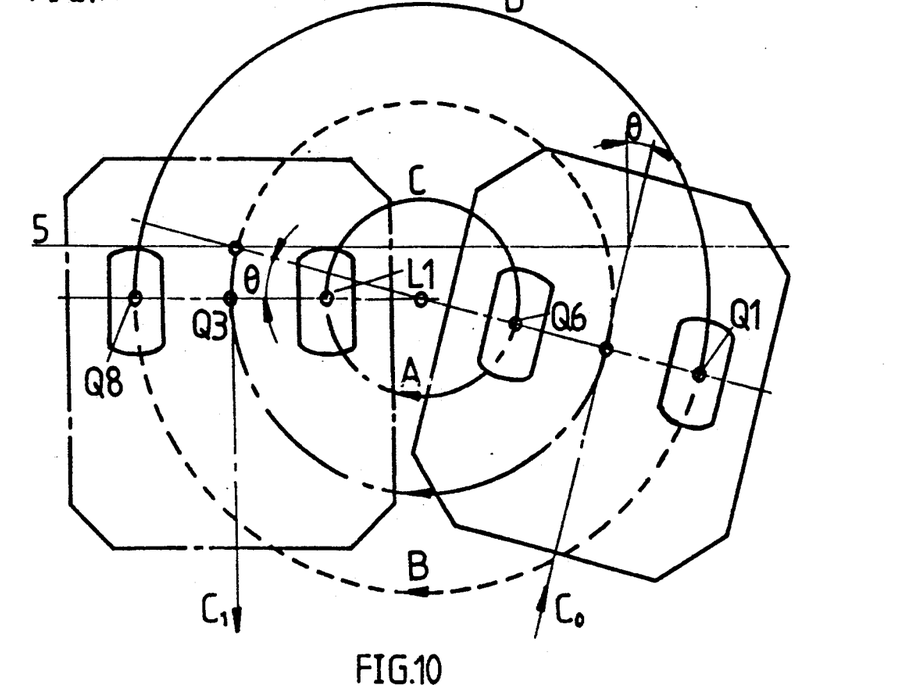
FIG. 10 illustrates the locus of the machine body when the machine turns backward, moves horizontally and forward at a negative deviation angle.

FIGS. 9 and 10 show that when the two sensors 41 and 42 sense the position of the lateral guide line (not shown), the deviation angle $\theta$ of the machine body can be obtained as mentioned in U.S. Pat. No. 3,570,227. The contained angle between the machine and the lateral guide line can obtained using the formula $\theta = \pm \tan^{-1}(d/L)$, where $-\pi/2 < \theta < \pi/2$. If the sensor that is senses that guide wire is in the same direction as the turning direction and the horizontal movement, the angle should be positive as shown in FIG. 9. Otherwise, the angle should be negative as shown in FIG. 10.

The movement of the two driving wheels 21 and 22 is controlled by the wheel drive unit 3. When the two wheels are moving at different speeds, the machine body has a turning movement. In that case, the center of the two-wheel axis also turns along a curve. The turning angle of that center is deemed positive when the center of the two wheel axis turns clockwise along that curve. However, if the center of the two-wheel axis is turned counter-clockwise along that curve, the angle is deemed negative. If the contained angle between the machine body and the lateral guide wire is "$\theta$" and the machine body turns reversely to become perpendicular to the lateral guide wire, the machine body turns clockwise at an angle of $\pi + \theta$ (i.e. 180° + $\theta$). However, if the machine turns counter-clockwise, the angle should be $-\pi + \theta$. Regardless of whether the sensors are mounted at both sides of the front of the device or at both sides of the wheel axis, if the two wheels turn clockwise around a center at two radii | W/2 − S/2 | and W/2 + S/2 respectively, the two wheels will move two distances A and B respectively, such that $$A = |((\pi+\theta)/2)(W-S)|, \text{and}$$

$$B = ((-\pi+\theta)/2)(W+S).$$

On the other hand, if the two wheels turn counter-clockwise around the center at two radii W/2 − S/2 and W/2 + S/2 respectively, the two wheels will move two distances C and D, such that $$C = |((-\pi+\theta)/2)(W-S)| \text{ and}$$

$$D = ((\pi+\theta)/2)(W+S).$$

In the above equations, $\theta$ is a contained angle formed by the moving direction of the machine body and a vertical line perpendicular to the lateral guide line, W is the distance between the two wheels and S stands for the horizontal displacement movement of the machine body.

When the deviation angle $\theta$ is not considered, the moving distances X and Y of the two drive wheels can also be obtained by turning the machine body at an angle of 180° to result in the machine body turning back and shifting a predetermined displacement S, such that $X = \pi/2 \, (W-S)$ $Y = \pi/2 \, (W+S)$.

Another method for turning the machine body, shifting the machine body a pre-determined displacement and thus making the machine body perpendicular to the lateral guide line is described as follows:

If the two sensors 41 and 42 are located at the same side of the lateral guide line and sense the same strong signal strength from the guide line, the wheel driver unit 3 drives the two wheels to make the machine body turn. Then, signals sensed by sensors 41 and 42 become different in strength. When the strength of the signals are equal to each other again, the direction of the machine body has changed to an opposite direction and the machine body also has been shifted a pre-determined displacement S. On the other hand, when the two sensors 41 and 42 sense two different strength signals from the lateral guide line, the wheel driver unit 3 drives the two wheels to turn the machine body. In that case, the signal strength varies with the turning in the following two conditions: If a strong signal becomes stronger and a weak signal becomes weaker, and then the two signals become equal in strength as detected by sensors 41 and 42, this indicates that the machine body is perpendicular to the lateral guide line and has shifted a predetermined displacement S. If a strong signal becomes weak and a weak signal becomes strong, and then the two signals become equal in strength as detected by the two sensors 41 and 42, this also indicates that the machine body is perpendicular to the lateral guide line and has shifted a predetermined displacement S.

I claim:

1. An automatic working machine capable of moving in a back and forth manner with reference to guide lines defining a finite area, said machine comprising:
   a machine body having front, rear, left and right sides;
   two independent driving wheels and at least a caster wheel for supporting and allowing movement of said machine body, one of said independent driving wheels being mounted on said left side and the other one of said independent driving wheels being mounted on said right side, each of said independent driving wheels being capable of rotating at continuously varying speeds in at least one of a forward and reverse direction to drive said machine body to move straight and to turn;
   guide line sensors mounted on said front of side to sense a position of lateral guide lines and to determine a moving direction of said machine body, said guide line sensors including left nd right sensors mounted on said left and right sides, respectively, of said machine body for sensing said guide line respectively and for enabling said wheel driver unit to determine an angle between a forward direction of said machine body and said guide line so as to control said machine to turn back;
   a two wheel driver unit for driving said two driving wheels to move said machine body, said two wheel driver unit comprising means for controlling said machine body by setting said two independent driving wheels at different speeds to turn back said machine body in accordance with the following conditions:
   (1) said machine body stops moving straight when said two guide line sensors sense the position of said guide line, the moving direction of said machine body and the direction perpendicular to said guide line forming an angle $\theta$, said angle $\theta$ is defined by the formula:

$\theta = +\tan^{-1}(d/L),$ for $-\pi/2 < \theta < \pi/2$ wherein a distance d is a difference between the distances traveled by said sensors in said moving direction of said machine body and a distance L is a mounting distance between said sensors and if a direction of the sensor that laterally senses said guide line is the same as a direction of shifted displacement of said machine body then $\theta$ is positive, otherwise $\theta$ is negative; and
   (2) said two driving wheels move at different speeds, turning said machine body, and one of said two wheels moves around a radius $$\frac{|W - S|}{2}$$

for a given distance "X", while the other one of said two wheels moves around a radius W+S for a given distance "Y", and after said machine body turns back so that said front of said machine body is perpendicular to said guide line, and a geometric center of said machine body shifts a predetermined displacement S thereof, and said machine body moves forward continuously, and if a distance between said two driving wheels is W, the distances "X" and "Y" can be obtained by:

$X = |((\pm \pi + \theta)/2) \, (W-S)|$ $Y = |((\pm \pi + \theta)/2) \, (W-S)|$ in which $\theta$ being the angle in step (1), and if said machine body turns counter-clockwise, said $\pi$ is prefixed with "−"; otherwise, said $\pi$ is prefixed with "+"; and
   two odometers providing feedback from said driving wheels to said two wheel driving unit for measuring rpm and mileage of said two driving wheels, the movement of said machine body including straight and turning movement, said straight movement being generally perpendicular to said guide line, and said turning movement varying the speed of said two independent driving wheels to reverse a direction of said machine body and shifting said machine body said pre-determined displacement.

2. An automatic working machine as claimed in claim 1, further comprising means for controlling said machine body to move straightly forward wherein said wheel driver unit counts a mileage of said left and right driving wheels respectively and minimizes the difference of said mileage to zero.

3. An automatic working machine as claimed in claim 2, where said wheel driver unit generates a motion instruction, whereby said machine body turns back after moving a present distance straightly forward so as to have said machine body turn reversely and shift a predetermined displacement S; and said two driving wheels move at different speeds respectively so as to have said machine body turn, i.e., one of said driving wheels moves a distance "X" around a radius, $$\frac{|W - S|}{2}$$

while the other wheel moving a distance "Y" around a radius $$\frac{W + S}{2};$$

said distance "X" and "Y" are obtained by:

$$X = \pm \pi/2 \, |W-S|$$
$$Y = \pm \pi/2 \, (W+S).$$

4. An automatic working machine capable of moving in a back and forth manner with reference to guide lines defining a finite area, said machine comprising:
- a machine body having front, rear, left and right sides;
- two independent driving wheels and at least a caster wheel for supporting and allowing movement of said machine body, one of said independent driving wheels being mounted on said left side and the other one of said independent driving wheels being mounted on said right side of said machine body, each of said independent driving wheels being capable of rotating at continuously varying speeds in at least one of a forward and reverse direction to drive said machine body to move straight and to turn;
- guide line sensors mounted on said front side to sense a position of lateral guide lines and to determine a moving direction of said machine body, said guide line sensors including left and right sensors mounted on said left and right sides, respectively, of said machine body for sensing said guide line respectively and for enabling said wheel driver unit to determine an angle between a forward direction of said machine body and said guide line so as to control said machine to turn back;
- a two wheel driver unit for driving said two driving wheels to move said machine body, said two wheel driver unit further comprising means for controlling said machine to turn backwards in accordance with the following conditions:
  (1) after said machine moves straight forward for said two guide line sensors to detect said guide line, the following situations occur: when said two guide line sensors are located at the same side of said lateral guide line, and have detected signals of the same strength, said driver unit drives said two independent driving wheels to move at different speeds turning said machine body backwards; then a signal strength detected by said two guide line sensors is different for each sensor and said signal strength detected becomes equal again when said machine body has turned reversely and shifted a pre-determined displacement S; and
  (2) when said two guide line sensors detect two signals respectively different in strength, said driver unit drives said two independent driving wheels to move at different speeds turning said machine body backwards, and one of said two driving wheels turns around a radius $$\frac{W + S}{2},$$

W being a distance between said two driving wheels, until a signal strength detected by said two guide line sensors becomes equal at each sensor, wherein the direction of said machine body is perpendicular to said guide line, and said machine body is shifted a predetermined displacement S; and
- two odometers providing feedback from said driving wheels to said two wheel driving unit for measuring rpm and mileage of said two driving wheels, the movement of said machine body including straight and turning movement, said straight movement being generally perpendicular to said guide line, and said turning movement varying the speed of said two independent driving wheels to reverse a direction of said machine body and shifting said machine body said pre-determined displacement.

* * * * *